United States Patent [19]
Dodgson

[11] 3,834,736
[45] Sept. 10, 1974

[54] ADJUSTABLE KINGPIN ASSEMBLY FOR TRAILERS

[76] Inventor: Gilbert Edward Dodgson, 412 9th Ave. West, Polson, Mont. 59860

[22] Filed: July 27, 1973

[21] Appl. No.: 383,372

[52] U.S. Cl. .............................................. 280/407
[51] Int. Cl. ............................................ B62d 53/08
[58] Field of Search ............................ 280/407, 433

[56] References Cited
UNITED STATES PATENTS
2,900,194  8/1959  De Lay ........................... 280/407 X
3,254,904  6/1966  Jewell ............................. 280/407 X

*Primary Examiner*—Stanley H. Tollberg
*Attorney, Agent, or Firm*—Wells, St. John & Roberts

[57] ABSTRACT

An assembly is described herein for enabling the load distribution and overall length of a tractor trailer combination to be selectively varied. The assembly includes a king pin mounted to an elongated support bar. The support bar is slidably carried within a channel fixed to the trailer. The support bar includes longitudinally spaced apertures through which a pair of locking pins are received to enable the king pin to be selectively locked at any of several longitudinal positions. By thus adjusting the king pin, the user is able to adjust the weight distribution of the load between the trailer rear wheels and the tractor drive wheels. Additionally, such adjustments enable one to vary the overall length of the semi-truck.

3 Claims, 6 Drawing Figures

ADJUSTABLE KINGPIN ASSEMBLY FOR TRAILERS

BACKGROUND OF THE INVENTION

The apparatus of the present invention relates broadly to semi-trucks having "king pin" or "5th" wheel assemblies for releasably interconnecting the semi-truck trailer to the tractor.

It is often desirable in the trucking industry to change the weight distribution of the trailer load between the rear wheels of the trailer and the drive wheels of the towing vehicle. For example, a greater concentration of weight might be beneficial when placed over the driving wheels of the towing vehicle when slippery road conditions are encountered. It is also desirable that the overall length of the tractor and trailer unit be adjustable to accommodate differing road conditions.

An adjustable king pin assembly and landing gear assembly for trailer-trucks is disclosed in the M. J. De Lay U.S. Pat. No. 2,889,154 for adjustment of the weight to wheel ratio and overall length of the tractor and trailer. The DeLay assembly is comprised of a drawbar connected to the landing gear of a trailer and slidably held for a longitudinal movement beneath the trailer. The king pin is fixed to the drawbar and is longitudinally moveable therewith along with the landing gear. A locking bolt is provided to selectively lock the king pin against longitudinal movement relative to the tractor in any of several longitudinal positions.

The J. T. Rodney U.S. Pat. No. 3,254,903 discloses a semi-trailer having an adjustable king pin wherein the king pin is operatively fixed to a motor driven pinion. The pinion is held in meshing engagement with an elongated gear rack fixed to the trailer. The king pin may be thereby longitudinally positioned along the rack by activating the pinion drive motor.

It is a first object of the present invention to provide an adjustable king pin assembly for trailers that is considerably stronger in construction and therefore relatively safer in use than presently known adjustable assemblies.

It is another object of this invention to provide such an adjustable king pin assembly that may be easily mountable to existing trailers or be constructed as an integral part of trailers during manufacture.

It is a further object of this invention to provide such an adjustable king pin assembly that is easily accessible for service or repair.

An additional object of the present invention is to provide such an adjustable king pin assembly that is very simple in design, utilizing fewer movable parts than the present known adjusting assemblies, and is therefore relatively maintenance free.

Another object of this invention is to provide such an adjustable king pin assembly that is attachable to different types and sizes of trailers.

A BRIEF DESCRIPTION OF THE DRAWINGS

DETAILED DESCRIPTION OF A PREFERRED EMBODIMENT

Figure 1:
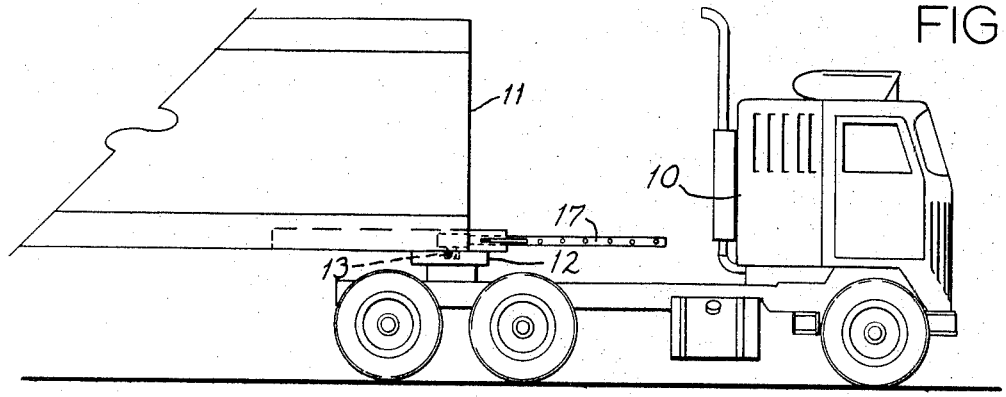
FIG. 1 is an operational view of the apparatus of the present invention mounted to a trailer and tractor with the king pin in a forward position.
Figure 2:
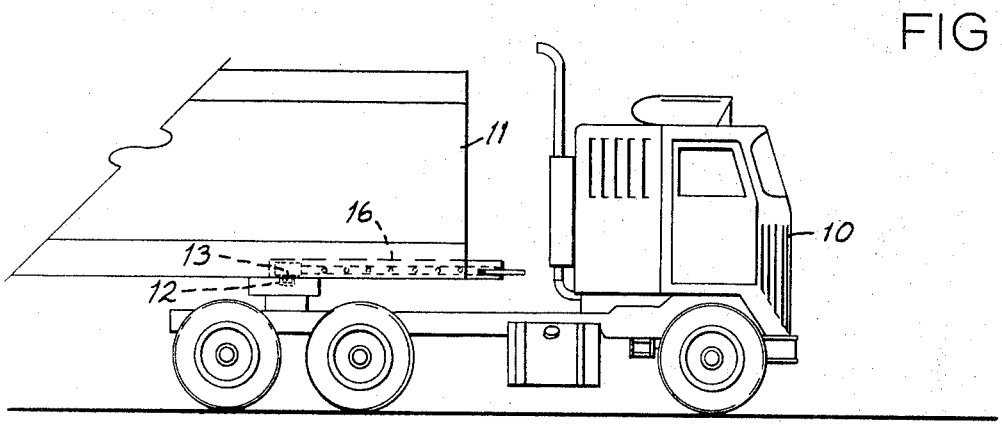
FIG. 2 is a view similar to FIG. 1, only showing a different operational view of the king pin assembly.

The apparatus of the present invention is intended to be utilized primarily with semi-trucks of the type generally illustrated in FIGS. 1 and 2. The tractor, designated in the drawings by the reference numeral 10, is provided with a "king pin" or "fifth wheel" assembly 12 that is utilized as a pivot mount for a king pin 13 (FIG. 6) mounted to the forward end of the trailer 11.

The king pin 13 of the present invention is mounted to a longitudinally moveable support bar 17. The support bar 17, in turn, is slidably held within an elongated channel 16 that is rigidly secured to the bottom of the trailer 11 along the longitudinal center thereof. The channel 16 may be immediately below the trailer floor between trailer frame members as shown in FIGS. 1 and 2. Alternatively, it may be affixed to the underside of the trailer for easier access to the internal structure of the assembly and to further facilitate simplified mounting of the assembly to existing trailers.

Figure 6:
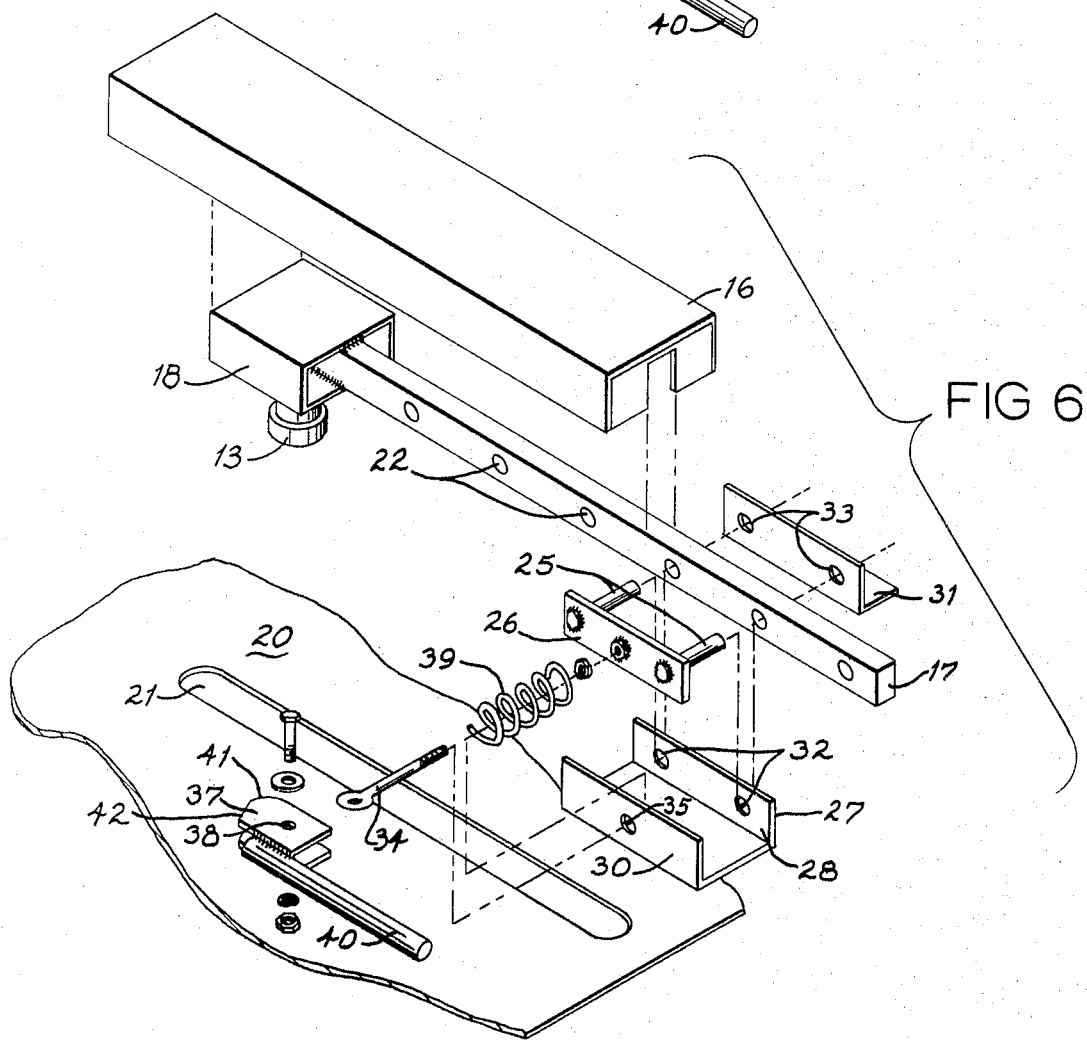
FIG. 6 is an exploded pictorial view of the assembly shown in FIG. 5.

The king pin support bar 17 includes an enlarged end piece 18 similar in shape to the inside of the channel 16. The support bar 17 and end piece 18 are slidably held within the channel 16 for longitudinal adjustable movement with respect to the channel between an extended position as shown in FIG. 1 and a retracted position shown in FIG. 2. The king pin 13 is mounted to the enlarged end piece 18 as shown in FIG. 6. The subassembly including the channel 16, the enclosed king pin support bar 17 and the end piece 18 are mounted to a bottom plate 20 which also may serve as structure of the trailer. A slot 21 is provided in the bottom plate 20 to slidably receive the king pin 13. It should be noted that the plate 20 may also be constructed as part of the entire assembly structure with the upper surface of the channel 16 being utilized to mount the assembly to the existing bottom structure of a trailer.

Figure 3:
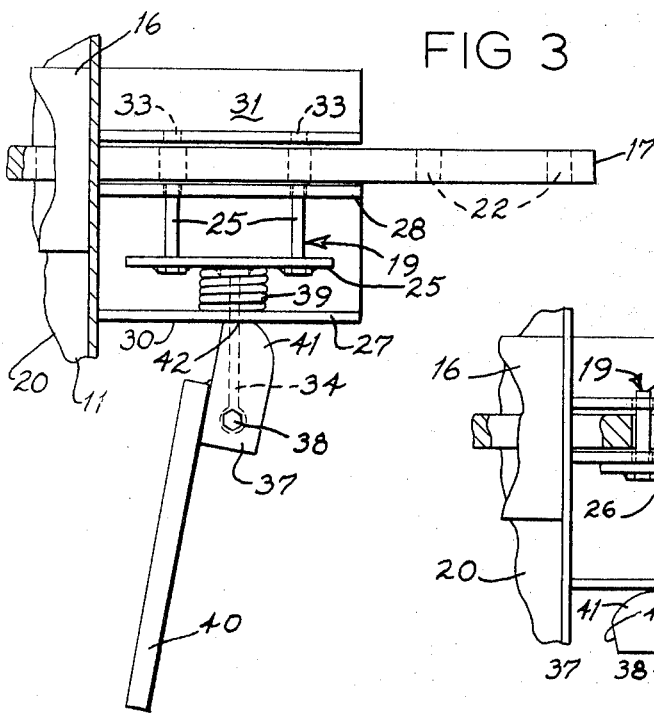
FIG. 3 is a fragmentary detailed plan view of the forward end of the assembly.
Figure 4:
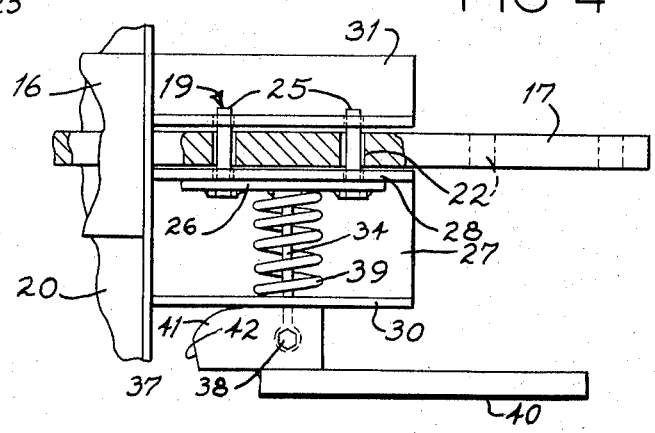
FIG. 4 is a plan view similar to FIG. 3, only showing different relative operational positions of the components illustrated therein.
Figure 5:
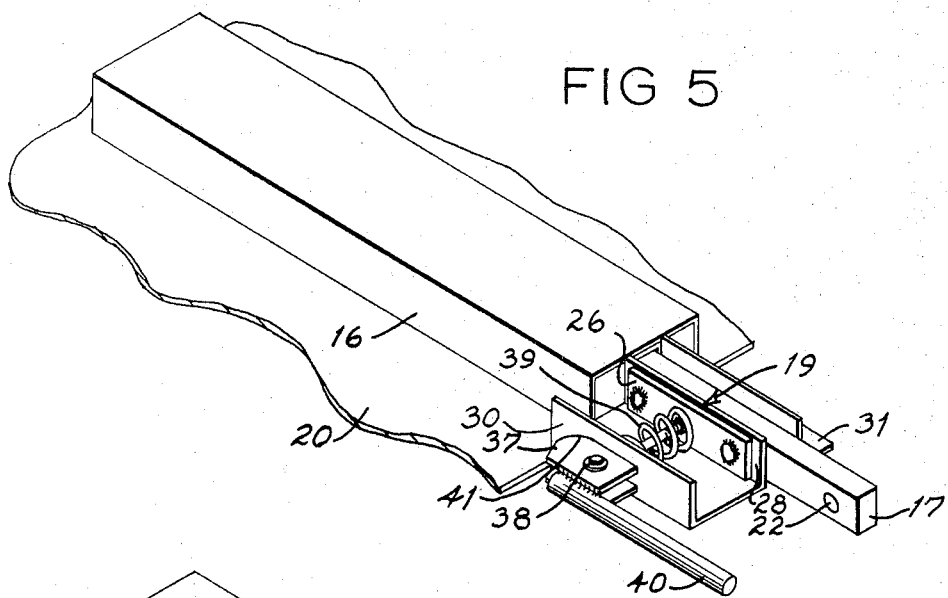
FIG. 5 is a pictorial view of the assembly.

FIGS. 3, 4 and 6 illustrate the support bar 17 as including a plurality of longitudinally spaced apertures 22 formed transversely therethrough. The apertures 22 are equally spaced along the king pin support bar 17.

The apertures 22 are designed to receive a pair of locking pins 25 of a locking means 19 located at the front end of the channel. The locking pins 25 are mounted rigidly to a plate 26. The pins 25 are spaced apart on the plate by a distance equal to the distance between successive apertures 22. The locking pins 25 and plate 26 are mounted within a U-shaped bracket 27 fixed to the channel 16 as a longitudinal extension thereof. The bracket 27 includes a first upright side 28 positioned adjacent to the king pin support bar 17 and a second upright side 30 parallel to and transversely spaced from the first upright side 28. The first upright side 28 includes spaced apertures 32 (FIG. 6) through which the locking pins 25 are slidably received. The apertures 32 serve to guide the locking pins 25 transversely through any two successive apertures 22 aligned complementary therewith. The two pins 25 are used for safety purposes to reduce shear stress imparted to the pins between the support bar 17 and side wall 28.

An angle iron 31 is rigidly fixed as an extension of the channel 16 adjacent the other side of the support bar 17 and includes two spaced apertures 33 therein. The apertures 33 are intended to receive the protruding ends of the locking pins 25 as shown in FIG. 4 to provide further additional shear resistance to the pins 25.

A coil compression spring 39 is provided as biasing means between the upright side wall 30 and the plate 26 to urge the locking pins 25 toward an operative locked position with the pins extending through corresponding apertures 22 as shown in FIG. 4. The locked position of the pins prevents relative longitudinal movement of the channel 16 and support bar 17. Thus, in this position the king pin is held stationary relative to the trailer 11. The spring 39 also serves to hold the cam plate 37 securely against the upright side wall 30.

An actuating means is provided to enable manual selective movement of the locking pins to and from the locked position and an unlocked position (FIG. 3) wherein the pins are retracted from apertures 22 and are held adjacent one side of the king pin support bar. The actuating means includes a connecting rod 34 extending from a side of the plate 26 opposite to the locking pins 25. The connecting rod 34 extends through an aperture 35 formed through the upright side wall 30 of bracket 27. The rod 34 pivotably mounts a lever arm 40.

The lever arm 40 is provided on the cam plate 37 to enable an operator to manually force the locking pins 25 to the inoperative unlocked position clear of the support bar 17 as shown in FIG. 3. In the unlocked position, the king pin may be freely moved longitudinally in slot 21. As the lever arm 40 is pulled outwardly away from the king pin support bar 17, the cam plate 37 is pivoted about the axis of pivot 38 and a curved cam surface 41 engages the upright side wall 30. Continued outward movement of the lever arm 40 brings the connecting rod 34 outwardly to compress the spring 39 between the plate 26 and the side wall 30. Once a fully retracted position is reached, a flat portion 42 of the cam 37 moves into engagement with the side 30 to hold the locking pins in the unlocked position, completely disengaged from the corresponding apertures 22 and the support bar 17.

In the outward unlocked position of the locking pins 25, the king pin support bar 17 and king pin 13 may be longitudinally adjusted within the channel 16 to any of several possible positions longitudinally along the trailer. Once a desired position of the king pin 13 is obtained, the lever arm 40 may again be operated to allow the spring 39 to urge the locking pins 25 into the newly aligned apertures 22.

It may be noted in FIGS. 1 and 2 that the longitudinal positioning of the king pin 13 may be accomplished with the tractor and trailer engaged by simply releasing the locking pins 25 to the unlocked position shown in FIG. 3. The tractor may then be moved rearward or forwardly relative to the trailer to move the king pin 13 to a position under the trailer 11 wherein the desired weight distribution or the length of the entire tractor and trailer unit is obtained. Once this position has been found, the operator may then simply move the lever arm 40 to the position shown in FIG. 4 to engage the locking pins 25 within the complementary apertures 22 aligned with the pins 25.

It may have become evident from the above description and the attached drawings that various changes in modifications may be made therein without departing from the scope of this invention. It is therefore intended that only the following claims be taken as definitions of the invention.

What I claim is:

1. An adjustable king pin assembly for a trailer comprising:

an elongated channel mountable to the trailer;
   an elongated king pin support bar slidably mounted within the elongated channel for longitudinal movement therein;
   a king pin fixed to the king pin support bar;
   a plurality of apertures extending transversely through the king pin support bar, the apertures being equally spaced longitudinally along the king pin support bar;
   locking means for selectively locking the king pin against longitudinal movement relative to the channel, including:
   two locking pins mounted for transverse movement relative to the king pin support bar;
   and biasing means for urging the locking pins toward a locked position wherein the pins extend through two successive apertures in the support bar apertures; and
   actuating means for operating the locking pins to retract to an unlocked position adjacent one side of the king pin support bar.

2. The invention set out in claim 1 wherein the locking means further comprises:

a U-shaped bracket included along one end of the channel and having one upright wall located adjacent the king pin support bar;
   apertures extending through the one wall and longitudinally spaced apart a distance equal to the distance between successive apertures in the king pin support bar, for slidably receiving the locking pins;

a plate mounting the locking pins on one side thereof;

the biasing means being located between the plate and the remaining upright wall of the U-shaped bracket for biasing the locking pins toward the unlocked position; and
   the actuating means being operatively connected between the U-shaped bracket and the locking pins for enabling the locking pin to be moved to and from the locked and unlocked position.

3. The invention set out in claim 2 wherein the actuating means comprises:

a connecting rod having one end thereof fixed to the plate and extending from the other side of the plate through a complementary aperture in the remaining upright wall of the U-shaped bracket;
   a cam plate pivotably mounted to the remaining end of the connecting rod for pivotal movement about a pivot axis;
   a lever arm fixed to the cam plate for pivoting the cam plate about the pivot axis;
   cam surfaces on the cam plate for engaging the remaining upright wall and moving the plate and locking pins between the locked and unlocked positions in response to the directional force applied to the lever.

* * * * *